Sept 17, 1957     A. R. MILLER, JR     2,806,686
WEIGHING DEVICE FOR AIRPLANES

Filed Nov. 3, 1954     2 Sheets-Sheet 1

INVENTOR.
Andrew R. Miller Jr,
BY
Parker, Brodmor Farmer,
Attorneys.

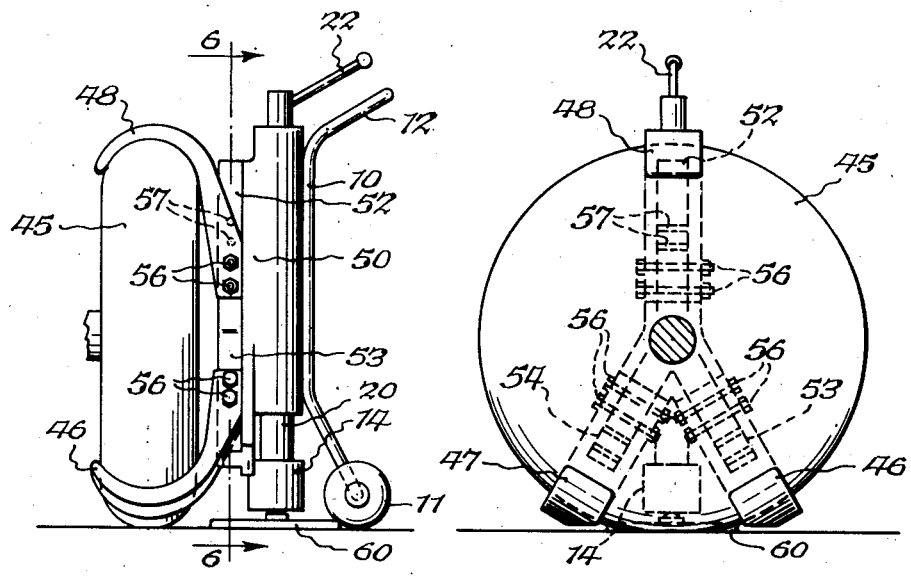
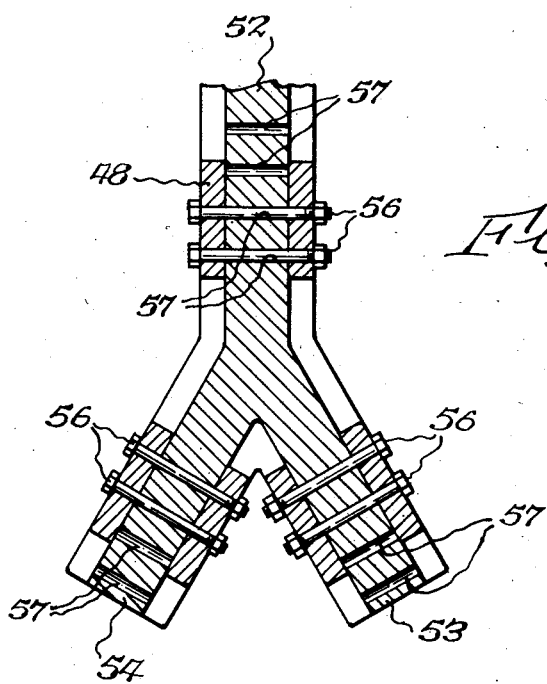

United States Patent Office 2,806,686
Patented Sept. 17, 1957

---

2,806,686

WEIGHING DEVICE FOR AIRPLANES

Andrew R. Miller, Jr., Buffalo, N. Y.

Application November 3, 1954, Serial No. 466,533

8 Claims. (Cl. 265—40)

This invention relates to improvements in devices for weighing airplanes or parts thereof.

In high speed airplanes, particularly those which operate at speeds in excess of the speed of sound, it has been found that it is necessary to load the plane uniformly at opposite sides of the longitudinal center thereof, since any unbalanced condition of the load causes dangerous vibrations of the plane when travelling at high speed. Weighing scales heretofore used for this purpose have been unsatisfactory, since such scales were generally arranged in trenches or excavations in the ground upon which a plane was moved for weighing the opposite sides thereof. Such weighing devices were not only expensive to install but also required an accurate location of the plane with reference to the same, which was sometimes difficult to achieve.

One of the objects of this invention is to provide a weighing device which may be readily moved into operative relation to a plane and includes means for lifting a part of the plane and for weighing the same while lifted.

Another object is to provide a device for weighing a part of an airplane, which is mounted on a truck or the like which can be readily moved to any part of an airplane, regardless of whether it is located in a hangar or on a runway.

It is also an object to provide a device of this type which is adjustable relatively to airplanes of different constructions in such manner that the weight of the plane or part thereof would be applied vertically to a weighing device.

Another object is to provide a weighing device of this kind which can be readily applied to airplanes of different types by means of various adjustments provided on the device.

It is also an object to provide a device of this kind which is mounted on a suitable support having outwardly extending legs formed to brace the weighing and the airplane to prevent tipping of the device in case of wind or other force acting on the plane.

Other objects and advantages will be apparent from the following description of one embodiment of the invention and the novel features will be particularly pointed out hereinafter in connection with the appended claims.

In the accompanying drawings:

Fig. 4 is a side elevation of a weighing device of modified construction for cooperation with a ground wheel of a plane.

Fig. 5 is an end elevation thereof as viewed from the opposite side of the wheel of the airplane.

Fig. 6 is a sectional elevation thereof, on an enlarged scale on line 6—6, Fig. 4.

Figure 1:
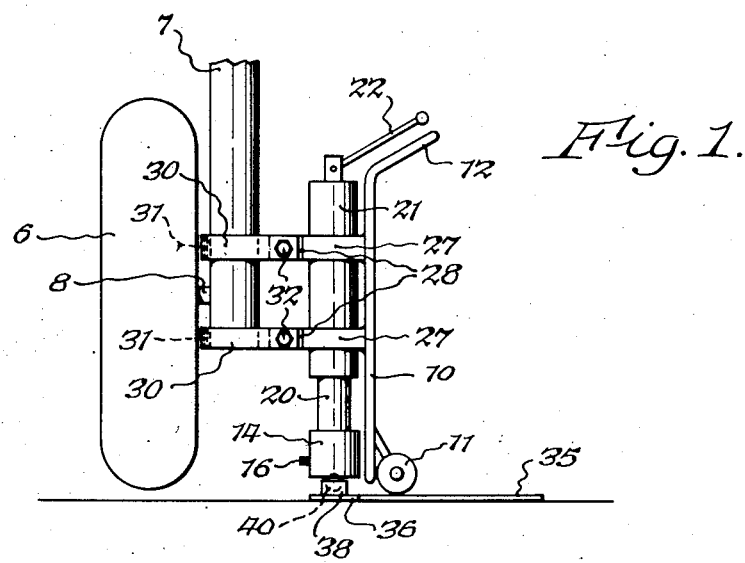
Fig. 1 is a side elevation of a weighing device embodying this invention.
Figure 2:
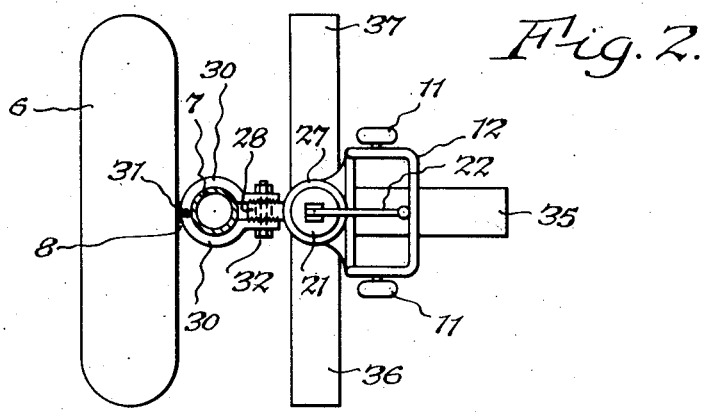
Fig. 2 is a top plan view thereof.
Figure 3:
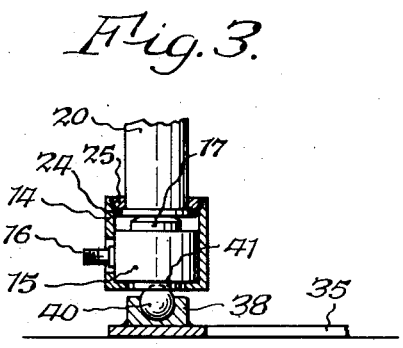
Fig. 3 is a fragmentary sectional view, on an enlarged scale, of the lower part of the device.

Figs. 1 to 3 of the drawings illustrate by way of example one form of my device applied to an airplane which includes a ground wheel 6 mounted on a landing gear including a frame member 7 on which the landing wheel 6 is mounted, for example, by means of an axle 8.

My improved weighing device is preferably mounted on a suitable hand truck 10 including wheels 11 and a handle 12. The device is so constructed as to support a weighing device when the body portion of the truck 10 is in the usual inclined position. The body of the truck, however, may be moved into a substantially upright position, shown in Fig. 1, in which the weighing device will rest on the ground.

My improved weighing device includes a housing member 14 in which a weight-indicating device 15 is contained. This device may be in the form of a compression weighing scale, such as are readily available on the market and which are of well known type and commonly referred to as "resistance wire strain gages." Further description of these weighing devices is, therefore, deemed unnecessary. The housing 14 is provided with an opening in the side thereof through which a duct 16 extends which carries electric conductors to a suitable instrument from which the weight placed on the instrument can be determined. The strain gage or weight indicator includes a plunger 17 of any suitable form which enters into the instrument 15 in accordance with the weight placed upon the same.

In order to make it possible to subject the strain gage or weight indicator to the weight of a part of an airplane, lifting means are provided including two relatively movable parts, one of which may be suitably connected with a part of an airplane and the other of which rests upon the weighing device plunger 17 of the strain gage. In the particular construction shown, I have provided a hydraulic jack for lifting the airplane part although other lifting means may be employed. This jack includes a piston or plunger 20 which is reciprocable in a cylinder located in or forming a part of a housing 21. A pump (not shown) is provided in the housing which may be actuated by means of a handle 22 to force fluid, such for example as oil, under pressure into the cylinder which cooperates with the piston or plunger 20. The lower end of the lifting plunger 20 rests upon the element 17 of the strain gage and the plunger 20 is preferably provided at its lower end with an outwardly extending flange 24 which may be retained within the housing 14 by any suitable means, such as an inwardly extending ring 25 having a threaded engagement with the upper end of the housing 14. By means of this construction, the hydraulic plunger 20 bears downwardly against the element 17 of the weight-indicating device. The housing 21 together with the parts connected therewith may be suitably supported on the frame of the truck 10 in any desired manner, and in the construction illustrated by way of example, the housing 21 is provided with a pair of rings 27 rigidly secured to the housing 21 and welded or otherwise secured to the truck frame 10. Suitable means are also provided for securing the housing 21 or the frame of the truck 10 to the part of the airplane to be weighed, and in the construction shown by way of example, the rings 27 are also provided with suitable clamps or brackets 28 extending outwardly from the rings 27 in a direction opposite to the body portion of the truck 10. These clamps are provided with means for releasably securing an airplane part, such for example as the frame member 7 to the housing 21 of the lifting device. In the construction illustrated, I have provided for each ring 27 a pair of clamping members 30 which are pivoted to each other at 31 and are shaped to grip the frame member 7 of an airplane. The two parts may be pressed toward each other by means of a bolt 32 extending through the extension or bracket 28 and which also secures its clamping device to the extension or bracket 28.

The bracket or extension 28 is preferably provided with suitable teeth or notches which prevent the gripping or clamping members 30 from swinging about the bolts 32. As a result of this construction, by releasing the bolt 32, the two clamping members 30 may be readily removed from the extension 28 of the housing 21 of the lifting device and replaced by other clamping or gripping members which may be made to fit frame members of other airplanes.

It will be obvious that when the part of the plane to be lifted is clamped to the housing 21, the plane part may be readily elevated by any suitable elevating means resting upon the strain gages 15. For example, if an hydraulic lifting mechanism is employed, the lifting may be effected in the usual manner by actuating the handle 22. Consequently, the weight of the part of the airplane to which the weighing device is attached may be determined by the usual instruments employed for that purpose with strain gages.

It is very important in connection with accurate weighing that the lifting device plunger 20 be arranged correctly in vertical positions while resting on the strain gage, so that there will be no binding of the plunger in its cylinder, so that the weight to be determined acts directly on the weighing device or strain gage.

The combined lifting and weighing device is mounted on a suitable base which in the construction shown is separable from the weighing device and consists of a series of legs or arms 35, 36 and 37, which extend outwardly in different directions from a central hub 38, so as to form a relatively steady base on which the combined lifting and weighing device may be mounted. These outwardly extending arms serve to distribute the weight of the part raised by said lifting device over an extended area and also steady the plane when raised, so as to avoid shifting of the same due to winds or air currents. The base is so constructed that it provides a substantially universal joint connection with the combined weighing and lifting device, and this in the construction illustrated is accomplished by means of a ball 40 seated in a socket formed in the hub portion 38 of the base and which extends upwardly to enter into a smaller socket formed in a downwardly extending part 41 of the strain gage or weighing device 15. The base is formed separately from the remainder of the apparatus and when used the base is first positioned in the desired location with reference to the airplane and the combined weighing and lifting device is then positioned on the base so that the upper end of the ball 40 will fit into the recess in the part 41 of the weighing device. By means of this arrangement, any inclination of the base because of irregularity of the ground or pavement on which the airplane is resting will not interfere with the free movement of the plunger 30 relatively to its cylinder and relatively to the housing member 14 containing the weighing device.

In the use of this combined weighing and lifting device, two of these devices are generally employed, one for each side of the landing gear so that both sides of the plane can be simultaneously held in hoisted position when supported on the weighing devices and the combined weighing and lifting devices are, therefore, positioned in correct relation to the part of the airplane which is to be weighed and the combined device is then attached to the airplane part with the ball 40 extending into the depression or recess in the part 41 of the strain gage. The lifting device is then operated, for example, by means of the handle 22 through which liquid is pumped into a cylinder to act on the piston or plunger 20 to raise the ground wheel of the plane slightly above the ground. The wheels 11 of the truck are so arranged so as to be above the surface of the ground when the combined weighing and lifting device is in upright position as also shown in Fig. 1. The weight of each side of the airplane can then be accurately determined, and if the load is unbalanced a part of the same can be shifted until the desired balance is obtained.

In the modified construction shown in Figs. 4 to 6 a similar arrangement is employed, except that the combined lifting and weighing device is applied to a ground wheel of the plane. The various parts of the apparatus are, consequently, approximately the same as shown in Figs. 1 to 3, except for the means for attaching the device to an airplane. For this purpose, means are provided for suitably gripping a tire 45 of the plane, such for example as three gripping arms 46, 47 and 48, which may be mounted on the housing 50 of the lifting device. Any suitable or desired means may be employed for connecting these arms with the housing 50 and in order to make the device adaptable for airplane tires of different sizes, the arms may be adjustably mounted on the housing member 50. In the construction shown by way of example, this housing member is provided with outwardly extending bracket parts which may, if desired, be formed integral with the housing member 50. The bracket parts, in the construction shown, include an upwardly extending part 52 and two downwardly extending parts 53 and 54 which diverge downwardly from each other. The arms 46, 47 and 48 may be suitably and adjustably secured to the parts 52, 53 and 54 respectively in any desired manner, and in the construction shown by way of example, the arms terminate at their inner ends in channel-shaped portions formed to straddle the bracket parts of the housing member 50. These channel-shaped portions may be secured to the outwardly projecting bracket parts of the housing in any suitable manner, for example, by means of bolts 56 and the arms 52, 53 and 54 are provided with a series of apertures 57 at different distances from the ends thereof, through which the bolts 56 may be passed for securing the arms in different relations to the housing member to enable the device to cooperate with tires of different diameters. The outer ends of the tire engaging arms may be of curved or other shape to enable them to extend partly around the tires without danger of having the weighing device become disengaged from the tires during the weighing operation.

The combined weighing and lifting device is also mounted on a separate and removable base 60 in the same manner as described in connection with Figs. 1 to 3. After the combined weighing and lifting device has been connected with a tire, the operation for lifting and weighing a part of the airplane is carried on in the same manner as described in connection with Figs. 1 to 3.

The devices described have the advantage that they can be readily moved into operative relation to an airplane, regardless of where the same is located, and consequently, eliminate the necessity of moving the airplanes into operative relation to the weighing devices, and also the devices herein described can be constructed at a much smaller cost than weighing devices of the type heretofore employed.

While my improved weighing and lifting device is herein described specifically for use in connection with airplanes, it will be obvious that the device may equally well be used for determining weights of other vehicles.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A device for determining the weight of a part of a vehicle and including a weighing device and a lifting device, said lifting device being mounted on said weighing device, means for securing said vehicle part to said lifting device, means for actuating said lifting device to elevate said vehicle part to support the weight thereof on said weighing device, a truck on which said weighing device and said lifting device are mounted, for positioning said devices in operative relation to the vehicle, said truck being tiltable to position said devices on a supporting surface independently of said truck.

2. A device according to claim 1, in which said truck is a hand truck comprising a body portion supported on a pair of wheels and on which said weighing and lifting devices are supported, with an end of said weighing device projecting beyond that end of said body portion adjacent to said wheels, whereby when said body portion of said truck is turned about said wheels into an approximately upright position, said devices will be supported independently of said truck on a supporting surface.

3. A device for determining the weight of a part of a vehicle, said device including a wheeled truck, a lifting device mounted on said truck, and including two parts movable lengthwise relatively to each other, a weighing device on which one of said parts of said lifting device is supported when said truck is tilted into a position in which said weighing device rests on the ground independently of said truck, means for securing said other part of said lifting device to a part of said vehicle, and means for moving said parts of said lifting device relatively to each other for supporting the weight of said vehicle part and truck on said weighing device.

4. A weighing device according to claim 3 and including a housing in which said weighing device is contained and into which said first mentioned part of said lifting device extends into contact with a part of said weighing device.

5. A weighing device according to claim 3, in which said securing means include gripping members mounted on said first mentioned part of said lifting device for gripping a wheel of the vehicle.

6. A weighing device for determining the weight of a part of a vehicle and including a frame member, a lifting device in the form of a hydraulic jack including a piston part and a cylinder part, a housing on which one of said parts of said lifting device is mounted with the other part thereof extending downwardly, a weighing device arranged below and in operative relation to said other part of said lifting device, means for pivotally supporting said weighing device with relation to the ground, a hand truck having a body portion secured to said housing and having a pair of wheels, said lifting and weighing devices being so mounted that when said truck is in inclined position said devices are supported on said wheels and when said truck is in upright position, said devices will be supported on the ground independently of said truck and wheels, and means secured on said housing for securing the same to a part of a vehicle.

7. A device for determining the weight of a part of a vehicle and including a weighing device and a lifting device, said lifting device being mounted on said weighing device, means for securing said vehicle part to said lifting device, a truck on which said weighing device and said lifting device are mounted and provided with wheels for transporting said truck and said devices for positioning the same in operative relation to the vehicle, said truck being tiltable about its wheels to position said devices on a supporting surface independently of said truck, a base normally detached from said truck and which is positioned for supporting said weighing and lifting devices on the ground, and cooperating parts on said base and said weighing device for pivotally supporting said weighing and lifting devices and said truck relatively to said base.

8. A device according to claim 7, in which said cooperating parts form a ball and socket joint between said device and said base.

References Cited in the file of this patent

UNITED STATES PATENTS

| | | |
|---|---|---|
| 944,335 | Lange | Dec. 28, 1909 |
| 949,435 | MacDonald | Feb. 15, 1910 |
| 2,443,045 | Magruder et al. | June 8, 1948 |
| 2,453,607 | Wardle et al. | Nov. 9, 1948 |
| 2,477,854 | Baker | Aug. 2, 1949 |
| 2,488,349 | Thurston | Nov. 15, 1949 |
| 2,670,195 | Baker | Feb. 23, 1954 |

FOREIGN PATENTS

| | | |
|---|---|---|
| 28,220 | France | Aug. 13, 1931 |